Patented Aug. 11, 1936

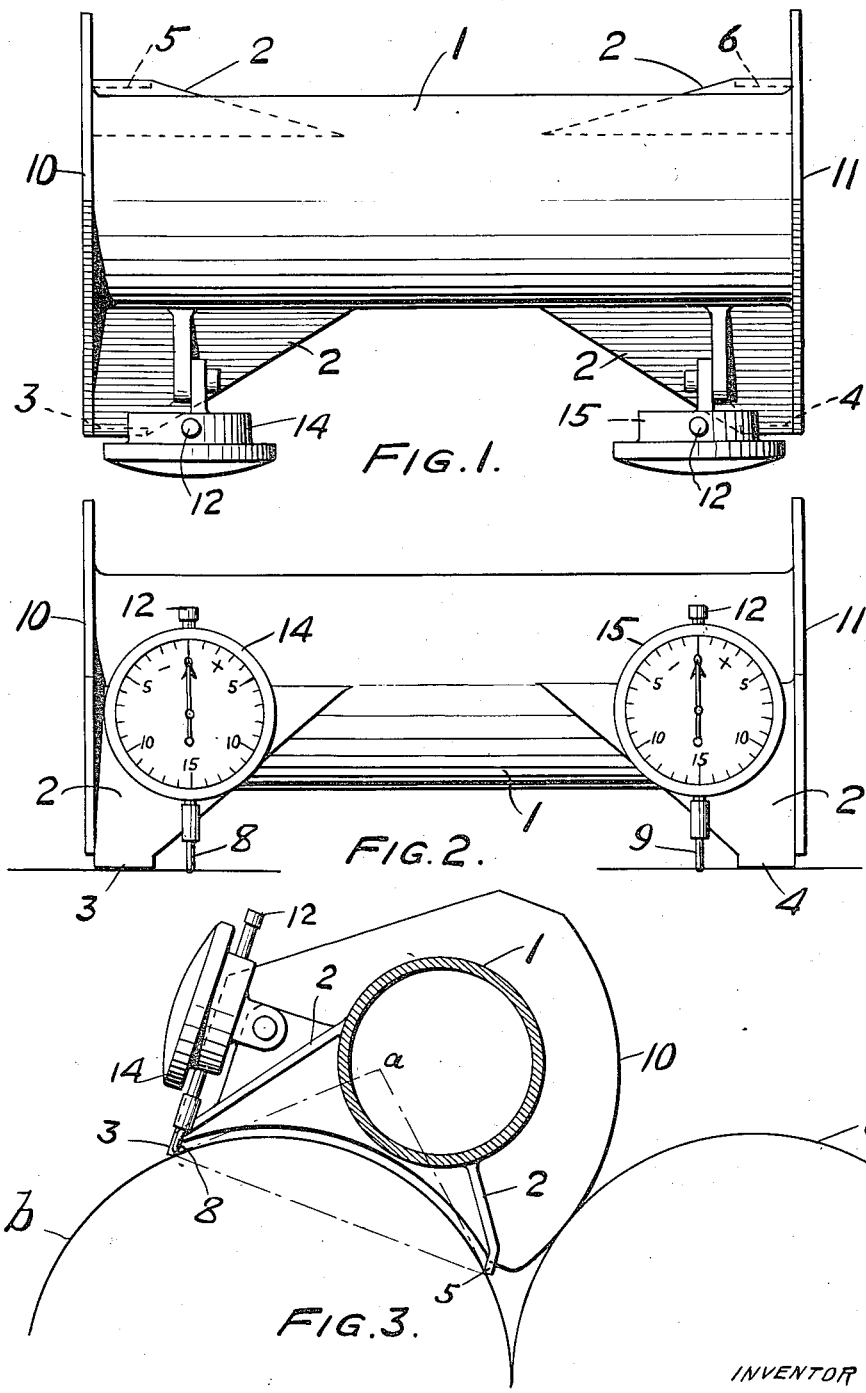

2,050,725

UNITED STATES PATENT OFFICE 2,050,725

ROLL PARALLELISM GAUGE

William Messinger, Philadelphia, Pa.

Application October 22, 1935, Serial No. 46,087

3 Claims. (Cl. 33—182)

The principal object of the present invention is to provide a simple reliable and comparatively inexpensive gauge for accurately determining whether or not a roll, such as is employed in a mill-stand, is cylindrical or is evenly ground from both ends toward the middle, and also for accurately determining whether or not mating rolls of a mill assembly are in proper alignment or parallelism.

Another object of the invention is to permit of the use of the gauge even though the rolls are assembled in a mill or like structure.

Another object of the invention is to permit of the readjustment of the rolls while the instrument or gauge is in position and until perfect alignment has been accomplished.

Other objects of the invention will appear from the following description at the end of which the invention will be claimed.

Generally stated, the invention comprises aligned and spaced front feet and aligned and spaced back feet parallel with the front feet and micrometer gauges having their operating spindles aligned with the front feet whereby when the gauge is supported by the curved surface of a truly cylindrical roll, or of a roll evenly ground from the ends toward the middle, or upon a surface plate, it rests on all four feet in parallelism with the axis of the roll and the micrometer gauge indications undergo no unequal changes, and when the gauge is supported by the curved surface of a roll not truly cylindrical or evenly tapering from the ends toward the middle, the feet situated at the smaller diameter will fall closer to the roll axis than those at the larger diameter and the resulting micrometer indications will correspond to the taper contour of the roll. In come cases the instrument is provided with spaced aligned identical arcuate stops adapted when the gauge is seated on one of the mating rolls and pushed toward the other mate roll to cause the gauge to be supported on both front feet, both rear feet, and both stops with equal change in micrometer indications if the rolls are in parallelism, and otherwise to be supported on both arcuate stops and three feet whereby the micrometer readings are changed. In general the edges of the four feet lie parallel to the roll axis when the surface is truly cylindrical or evenly ground from the ends toward the middle and when mating rolls are parallel; otherwise these edges assume a position inclined to the roll axis causing unequal changes in the indications of the micrometer gauges from the initial readings obtained with a plane surface.

The invention also comprises the improvements to be presently described and finally claimed.

In the following description reference will be made to the accompanying drawing forming part hereof and in which, Figure 1 is a top or plan view of the instrument.

Figure 2 is a front view of the same; and

Figure 3 is a transverse sectional view illustrating the instrument in application to mating rolls.

While reference has been made and will be made to the rolls of a rolling mill the instrument is useful for detecting taper, concavity, convexity and other irregularities and deviations from true cylindrical form of a body, and the instrument can be used to check any machine which includes a stack of rolls in vertical or horizontal sequence; for example, paper calenders, textile calenders, press rolls, mangles, printing rolls and the like.

Referring to the drawing, 1 indicates a hollow cylindrical body provided with front and back legs 2 and these constitute what may be designated the frame of the instrument. There are aligned and spaced front feet 3 and 4 and aligned and spaced back feet 5 and 6. 14 and 15 are micrometer gauges having spring pressed spindles 8 and 9 aligned with the front feet 3 and 4 and arranged adjacent thereto. The instrument is also provided with spaced aligned identical arcuate stops 10 and 11. These are struck, as shown from a center $a$ at the apex of an isosceles triangle having its base drawn through the back and front feet. This is indicated by dash and dot lines in Figure 3. However, this arrangement may be departed from if desired and in accordance with the capacity of the instrument with respect to rolls of different sizes.

The mode of operation may be described as follows: If the instrument is placed upon a plane surface it will rest on the front and back feet 3, 4, 5 and 6 and the micrometer gauges can be set to zero by means of the adjusting screws 12. The instrument may be regarded as having a longitudinal axis to which the edges of the four feet and the boundary surfaces of the two stops are all parallel. When the feet rest on the surface of a purely cylindrical roll, their edges coincide with two elements of the surface and the axis of the instrument is necessarily parallel to all the elements of the cylinder and to its central axis. Under these conditions the micrometer gauges would not deviate from an initial zero adjustment made on a surface plate.

If, however, the roll is tapered then the pair of front and rear feet situated at the smaller diameter will fall closer to the roll axis than the pair at the larger diameter. The axis of the instrument will be inclined to that of the roll and the micrometer gauges will indicate unequal deviations from the initial zero setting. For a roll of a given diameter, the magnitude of these deviations will be a measure of the amount of taper or curvature of the roll surface.

If the roll is evenly crowned or tapered from the ends to the middle, the instrument will indicate the presence of this departure from truly cylindrical shape. By placing the instrument directly at the middle of such a roll the feet will all be equidistant from the axis and the axis of the instrument will be parallel to that of the roll, but there will nevertheless be deviations of the micrometers from zero adjustment. These deviations of the two gauges will be equal to each other and in proportion to the amount of taper or crown.

On testing the parallelism of purely cylindrical or evenly tapered mating rolls, the instrument is placed at the middle of one of the rolls $b$ with its four feet resting on the surface, and is then moved into the cleft of the rolls until the stops 10 press against the second roll $c$. If the axes of the rolls are parallel they will both be parallel to that of the instrument so that all four feet will rest on one roll $b$ and both stops will at the same time be in contact with the second roll $c$. If the axes of the rolls are not in parallelism it will of course be impossible for the axis of the gauge to be parallel to the axis of both rolls, hence when the four feet are in contact with the first roll only one stop alone can touch the second. There will be an air gap between the remaining stop and the second roll which, other things being equal, will vary with the obliquity of the roll axis. In determining the misalignment of such non-parallel rolls the procedure is to shift the instrument so as to close this gap and place both stops in contact with the second roll. This necessitates the withdrawal of one of the four feet from the surface of the first roll, and the consequent deflection of the micrometers will indicate the extent and direction of adjustments necessary to produce the condition of parallelism.

It will be obvious to those skilled in the art to which the invention relates that modifications may be made in details of construction and in matters of mere form without departing from the spirit of the invention which is not limited to such matters or otherwise than the prior art and the appended claims may require.

I claim:

1. A roll parallelism gauge comprising aligned and spaced front feet and aligned and spaced back feet parallel with the front feet, micrometers having spring pressed spindles aligned with and spaced clear of the front feet and an intervening structure for securing the spaced front and back feet and the spindles in the described relative positions, whereby when the gauge is supported by the curved surface of a truly cylindrical roll or of a roll ground evenly from the ends towards the middle it rests on all four feet in parallelism with the axis of the roll and the micrometer indication is unchanged, and when the gauge is supported by the curved surface of a roll not truly cylindrical or evenly ground from the ends toward the middle the feet situated at the smaller diameter will fall closer to the roll axis than those at the larger diameter and the resulting micrometer indications will correspond to the taper contour of the rolls.

2. A roll parallelism gauge comprising parallel spaced back and front feet, micrometer gauges having spring pressed spindles aligned with the front feet spaced aligned arcuate stops adapted when the back and front feet are seated on one roll and pushed in the cleft toward the other roll to cause the gauge to be supported on all feet and both stops without change of micrometer reading if the rolls are in parallelism and otherwise to be supported on both arcuate stops and three feet whereby the micrometer readings will indicate the deviation of the rolls from parallel and an intervening structure for securing the spaced front and back feet and the spindles and the stops in the described relative positions.

3. A roll parallelism gauge comprising two aligned front feet and two aligned rear feet parallel to the front feet and two coaxial arcuate stops having coincident surface elements parallel to the axes of front and rear feet and upon all of which the gauge can rest when placed in contact with parallel rolls and upon no more than five of which the gauge can rest when placed in contact with non-parallel rolls, micrometers having spring pressed spindles associated with one pair of feet so as to provide visible indication of non-parallelism of mating rolls and an intervening structure for securing the spaced front and rear feet and the spindles and the stops in the described relative positions.

WILLIAM MESSINGER.